No. 831,464. PATENTED SEPT. 18, 1906.
P. T. O'LEARY.
BOLT RETAINER.
APPLICATION FILED JUNE 1, 1904.
2 SHEETS—SHEET 1.
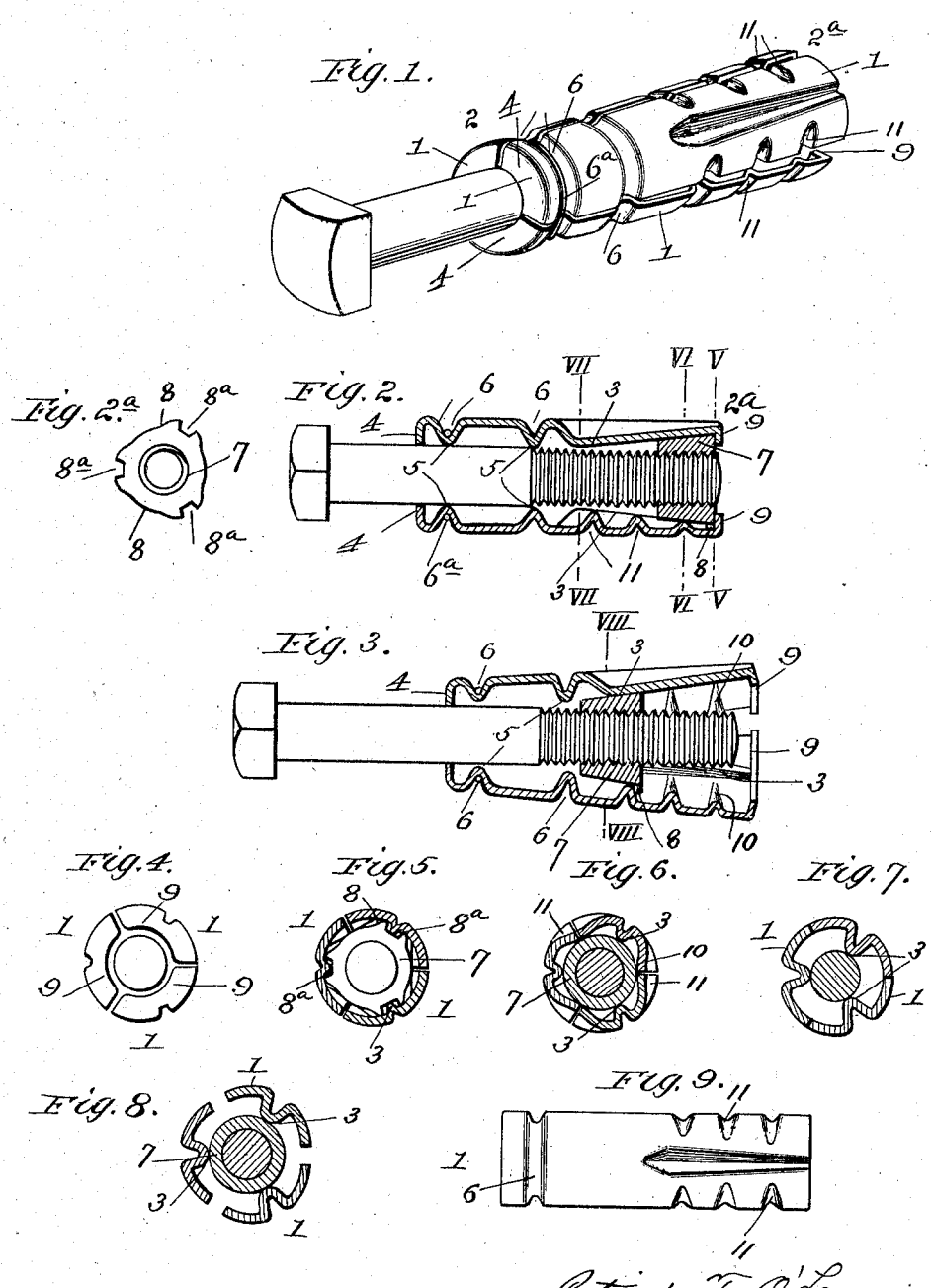

No. 831,464. PATENTED SEPT. 18, 1906.
P. T. O'LEARY.
BOLT RETAINER.
APPLICATION FILED JUNE 1, 1904.

2 SHEETS—SHEET 2.

Witnesses
F. M. Babbitt
Emma Kaufmann

Patrick T. O'Leary
Inventor
By his Attorneys Davis & Davis

UNITED STATES PATENT OFFICE.

PATRICK T. O'LEARY, OF NEW YORK, N. Y.

BOLT-RETAINER.

No. 831,464.  Specification of Letters Patent.  Patented Sept. 18, 1906.

Application filed June 1, 1904. Serial No. 210,691.

*To all whom it may concern:*

Be it known that I, PATRICK T. O'LEARY, a citizen of the United States, residing in the borough of Manhattan, city, county, and State of New York, have invented certain new and useful Improvements in Bolt-Retainers, of which the following is a specification, reference being had therein to the accompanying drawings, in which—

Figure 10:
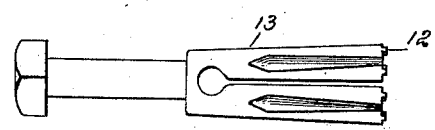
Figure 11:
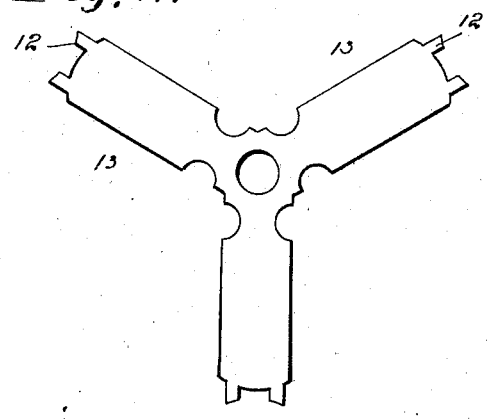

Figure 1 is a perspective view showing the retainer or anchor shell expanded; Fig. 2, a longitudinal sectional view; Fig. 2ª, an end view of the expanding-nut; Fig. 3, a longitudinal sectional view, the shell being expanded; Fig. 4, an end elevation; Fig. 5, a transverse sectional view on the line V V of Fig. 2; Fig. 6, a sectional view on the line VI VI of Fig. 2; Fig. 7, a sectional view on the line VII VII of Fig. 2; Fig. 8, a sectional view on the line VIII VIII of Fig. 3; Fig. 9, a detail of one section of the shell; Fig. 10, an elevation showing the shell formed from a one-piece blank; Fig. 11, a detail view of the blank; and Fig. 12 a longitudinal sectional view showing a bolt arranged with its head within the shell.

One of the many objects of the invention is to provide a retainer or anchor shell for bolts of this class formed of a plurality of sheet-metal members having cam-surfaces on their inner sides, said members being adapted to be assembled to form a substantially cylindrical shell and to be expanded radially by means of a suitably-shaped nut or part moving longitudinally in the shell.

Another object of the invention is to provide said retainer or expansion shell with one or more annular interior shoulders, which form centering supports and guides for the bolt.

A further object of the invention is to provide the shell with inward-turned flanges at its ends, the flange at the bolt end of the shell serving as a guide and a support for the bolt, the internal diameter of the shell at this flange being equal to the diameter of the bolt and the flange at the nut end of the shell acting as a retaining means to hold the nut within the shell against accidental displacement when the bolt is detached.

Other and equally important objects and advantages of the invention will appear hereinafter.

The retainer or expansion shell is preferably made of sheet metal; but it will of course be understood that it may be cast, if desired. It is preferably made up of three independent separable sections or members; but it will of course be understood that any number may be employed and that these members may be joined together at the bolt end of the shell, if desired, and the entire shell formed from a single blank.

The expansion-shell is formed of a plurality, preferably three, independent sections or members 1, which are connected together near the bolt end 2 in such a manner as to form a cylindrical shell and to permit them to be readily expanded at the nut end 2ª thereof. Each of these sections or members of the shell is provided with a longitudinally-extending interior cam-surface 3, which is located midway between the longitudinal edges of said section, said cam-surfaces extending a suitable distance inward from the nut end of the shell and being highest at their inner ends—that is, at the point the greatest distance from the nut end. These cam-surfaces are preferably formed by forcing inward the metal by suitable dies. It will of course be readily understood from the foregoing, when taken in connection with the drawings, that the internal diameter of the shell is greatly restricted by these interior cam-surfaces, the smallest diameter thereof being at the inner ends of the cam-surfaces, as shown clearly in Fig. 7. I prefer to form these cam-surfaces with their longitudinal walls substantially radial, the object being to so place the metal as to take the pressure of the expanding-nut without distorting or flattening the cam-surfaces.

Each member or section of the retainer is bent at its bolt end to form the flange 4, which when the members are assembled forms an annular guide and support for the bolt and materially stiffens the retainer. Each section is also bent inward transversely near the bolt end thereof, so that when all the sections are assembled together an annular shoulder 5 will be formed on the interior of the shell and an annular groove 6 will be formed in the exterior thereof. The diameter of the interior of the shell at this shoulder is just equal to the diameter of the bolt to be used in the shell. The exterior groove and the internal shoulder perform certain independent functions. The shoulder acts as a guide and centering support for the bolt, and the exterior groove is adapted to receive projections extending inward from the walls of the aperture in which the shell is to be placed, or it may be filled with cement or lead or similar material after the shell has been expanded and it is desired to permanently lock it in its final position. When long shells are used, two of these grooves and interior shoulders may be used, as shown in Figs. 1, 2, and 3, giving to the bolt two points of support and effectually preventing any lateral movement of the bolt in the shell under a load which brings a shearing strain on it—that is, a strain perpendicular to the axial line of the shell.

To secure the members of the shell together, a binding-wire $6^a$ is placed in the groove 6, the ends of said wire being twisted or otherwise secured together. When two grooves are employed, as shown in Figs. 1 and 2, this wire is preferably placed in the one nearer the bolt end of the shell. It will of course be understood that I may connect these sections together in any suitable manner, the method shown being one of the many ways this may be accomplished.

The shoulder 5 may be located quite close to the adjacent end of the cam 3 to form a stop for the expanding-nut when said nut has reached the highest point on the cams 3. This stop prevents the nut being drawn out far enough to drop off said cams. When two shoulders are employed, of course the inner one will be so placed as to form the stop for the nut, as shown in Figs. 2 and 3.

Within the shell is a conical nut 7, which is formed at its inner enlarged end with an annular outward-extending flange 8. This flange is notched at three points $8^a$ to receive the cams 3 on the inner sides of the members of the shell, said cams being substantially V-shaped in cross-section, and the exterior of the nut is tapered to correspond to the longitudinal incline of the said cams. The cams prevent the nut or other expanding part from turning during the expansion of the retainer. The nut normally lies at the nut end of the shell, and the bolt draws it inward, causing its exterior to bear against the cams 3, thereby expanding the shell and separating the members at the nut ends thereof. To retain the nut in the unexpanded shell, the ends of the members are bent inward to form the flange 9, against which the flanged end of the nut bears when the shell is in its unexpanded position. This retaining-flange is of great importance, because without it it would be difficult to retain the nut in position in the shell when dropping the shell into a vertical aperture. It is also of great advantage when merchandising the device—that is, in handling it in trade. If the nut were not confined within the expandible shell, it would frequently drop out in transportation, and when it was used in a vertical aperture it would be especially liable to be displaced, thereby causing much annoyance and frequently great delay.

Each section 1 of the shell is formed with the transverse interior shoulders or cams 10 and exterior depressions or indentations 11, near the nut end thereof. These depressions and shoulders terminate a short distance from the adjacent cam 3 and vary in height, each being equal in height to the adjoining portion of the cam. As clearly shown in Fig. 2, the shoulder 10 nearest the flange 9 is the lowest, the others increasing in height toward the bolt end of the section. All of these shoulders are adjacent the cam 3 and are so placed that the exterior of the expanding nut or part will engage them in succession as it is drawn out by the bolt. The nut is long enough to bridge the spaces between the shoulders, so that it will rest on at least one of said shoulders at all times and in certain positions will engage two of them. These transverse ribs or shoulders greatly strengthen the shell, and the depressions are adapted to receive any projections on the walls of the opening in which the shell is to be placed. The flange of the expanding-nut is cut out, as shown in Figs. $2^a$ and 5, to permit the nut to ride over the transverse shoulders.

Figure 12:
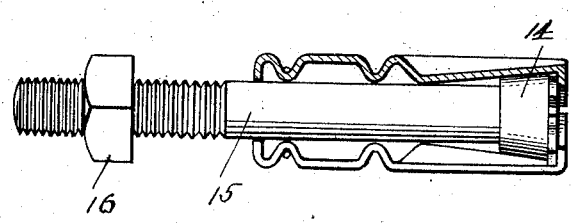

While I prefer to form the shell with the longitudinal cams 3 and the transverse shoulders 10, it will be readily understood that one or the other may be omitted—that is, the cams 3 may be employed without the shoulders 10, as shown in Fig. 12, and the shoulders 10 may be employed without the cams 3, if desired. It is obvious that in retainers of large diameter two or more cams 3 may be employed on each section.

I prefer to form the shell of three independent separable and identical sections stamped from sheet metal of the proper thickness, as that will be the cheapest method of manufacture and will enable me to utilize small pieces of metal. It may be desirable, however, to make the shells for small bolts from a single blank, as shown in Figs. 10 and 11. As shown in these figures, the transverse shoulders or ribs 10 are omitted; but of course it will be understood that these may be stamped in the blank, if desired. On the ends of the members 13 of the blank are formed small projections 12, which when the blank is shaped to form the retainer are bent inward to confine the nut and prevent its accidental displacement.

In Fig. 12 is shown a bolt 15 arranged within the shell, the nut 16 being movable on the threaded projecting end thereof. In this arrangement of the parts the bolt-head is properly shaped to act as an expanding part. This form of the device may be used in special cases where it is necessary to detach objects held without disturbing the parts of the retainer.

It will thus be seen that I provide a sheet-metal shell of great strength, the longitudinal and transverse interior ribs or shoulders greatly bracing and stiffening the structure.

It will also be seen that each interior shoulder and exterior groove, as well as the end flanges, has an additional function besides the one of adding strength to the structure.

Having thus described my invention, what I claim as new, and desire to secure by Letters Patent, is—

1. A bolt-retainer comprising a plurality of sheet-metal sections adapted to fit together to form a complete substantially cylindrical shell, each section being formed with a longitudinal interior cam extending from the nut end thereof inward, said cam gradually increasing in height from the nut end of the section, a correspondingly-shaped and coincident depression in the exterior of each section, a tapered nut within the shell and adapted to ride on said cams, a radial flange formed on said nut at the larger end thereof said flange being notched to fit the longitudinal cams on the shell-sections whereby said nut will be prevented from turning, transverse exterior grooves and corresponding interior shoulders formed in the shell-sections, said grooves being adapted to register to form an annular exterior channel and the interior shoulders forming an annular bolt-guide to direct the bolt to the nut, said interior shoulder being arranged close to the ends of the cam-surfaces to form a stop for the nut to limit its inward movement and prevent it being drawn off the inner ends of the longitudinal cams.

2. A bolt-retainer comprising a plurality of members connected together at one end to form a substantially cylindrical expansible shell, each member being formed with a longitudinal interior cam, said cam gradually increasing in height from the nut end of the member, a tapered expanding part within the shell and adapted to ride on said cams, a radial flange formed on said expanding part, said flange being notched to fit the cams on the members whereby said expanding part will be prevented from turning, and inward-extending annular flanges at each end of the shell, one of said flanges serving to retain the expanding part within the shell and the other serving as a bolt-centering means.

3. A bolt-retainer comprising a plurality of sheet-metal sections, each section being formed with a longitudinally-extending interior cam increasing in height from the nut end thereof inward, a correspondingly-shaped coincident depression being formed in the exterior of each section, each section being also formed with transverse interior shoulders and corresponding exterior grooves, whereby each sheet-metal section will be braced longitudinally and transversely, in combination with a tapered expanding-nut within the shell formed by said sections, said nut being adapted to ride on the interior longitudinal cams, and a bolt adapted to engage said expanding-nut, the interior transverse shoulders forming a centering means and support for said bolt.

In testimony whereof I hereunto affix my signature, in the presence of two witnesses, this 31st day of May, 1904.

PATRICK T. O'LEARY.

Witnesses:
JAMES E. COSTILO,
WM. R. DAVIS.